US012565185B2

(12) United States Patent
Amann

(10) Patent No.: US 12,565,185 B2
(45) Date of Patent: Mar. 3, 2026

(54) PNEUMATIC PRESSURE CONTROL VALVE FOR A BRAKE CONTROL SYSTEM OF A RAIL VEHICLE, AND PNEUMATIC CONTROL VALVE FOR A BRAKE CONTROL SYSTEM OF A RAIL VEHICLE

(71) Applicant: KNORR-BREMSE SYSTEME FÜR SCHIENENFAHRZEUGE GMBH, Munich (DE)

(72) Inventor: Klaus Amann, Unterföhring (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 489 days.

(21) Appl. No.: 18/020,857

(22) PCT Filed: Jul. 7, 2021

(86) PCT No.: PCT/EP2021/068292
§ 371 (c)(1),
(2) Date: Feb. 10, 2023

(87) PCT Pub. No.: WO2022/008364
PCT Pub. Date: Jan. 13, 2022

(65) Prior Publication Data
US 2024/0010178 A1    Jan. 11, 2024

(30) Foreign Application Priority Data
Jul. 7, 2020    (DE) ..................... 10 2020 117 846.8

(51) Int. Cl.
B60T 15/02    (2006.01)
B60T 15/18    (2006.01)
G05D 16/10    (2006.01)

(52) U.S. Cl.
CPC .......... B60T 15/021 (2013.01); B60T 15/184 (2013.01); G05D 16/103 (2013.01)

(58) Field of Classification Search
CPC ...... B60T 15/021; B60T 15/18; B60T 15/181; B60T 15/182; B60T 15/184; B60T 15/20
See application file for complete search history.

(56) References Cited

U.S. PATENT DOCUMENTS 4,768,556 A * 9/1988 Rees ....................... B60T 15/18
137/627.5
4,886,089 A * 12/1989 Gabrlik ............ B60K 15/03519
137/44
(Continued)

FOREIGN PATENT DOCUMENTS

DE        19835635 C2    5/2000
DE        10354248 A1    6/2005
(Continued)

OTHER PUBLICATIONS

International Search Report and Written Opinion corresponding to PCT/EP2021/068292 dated Sep. 27, 2021.

*Primary Examiner* — Thomas J Williams
(74) *Attorney, Agent, or Firm* — Barnes & Thornburg LLP

(57) ABSTRACT

A pneumatic pressure control valve for a brake control system of a rail vehicle includes a first pressure chamber to which a brake pressure can be applied, and a second pressure chamber to which a predetermined, adjustable pressure can be applied, wherein the first pressure chamber and the second pressure chamber are sealed off with respect to one another via a pressure compensation piston, and wherein the pressure compensation piston is designed to open a flow connection from the first pressure compensation chamber to a ventilation duct when the effect of the pressure on the pressure compensation piston in the first pressure chamber is (Continued)

greater than the effect of the pressure on the pressure compensation piston in the second pressure chamber.

10 Claims, 1 Drawing Sheet

(56)                References Cited

U.S. PATENT DOCUMENTS

| | | | | |
|---|---|---|---|---|
| 2014/0103237 A1* | 4/2014 | Herges | ................. | B60T 15/182 |
| | | | | 251/129.01 |
| 2015/0224973 A1 | 8/2015 | Amann et al. | | |
| 2024/0010178 A1* | 1/2024 | Amann | ................. | B60T 15/021 |

FOREIGN PATENT DOCUMENTS

| | | | | | |
|---|---|---|---|---|---|
| DE | 102012009425 | B3 * | 11/2013 | .............. | B60T 13/36 |
| DE | 102012108538 | A1 | 3/2014 | | |
| EP | 1044125 | B1 | 11/2002 | | |
| GB | 754192 | A | 8/1956 | | |
| GB | 1174243 | A | 12/1969 | | |
| WO | 2014040933 | A1 | 3/2014 | | |

* cited by examiner

PNEUMATIC PRESSURE CONTROL VALVE FOR A BRAKE CONTROL SYSTEM OF A RAIL VEHICLE, AND PNEUMATIC CONTROL VALVE FOR A BRAKE CONTROL SYSTEM OF A RAIL VEHICLE

CROSS REFERENCE AND PRIORITY CLAIM

This patent application is a U.S. National Phase of International Patent Application No. PCT/EP2021/068292 filed Jul. 2, 2021, which claims priority to German Patent Application No. 10 2020 117 846.8, the disclosure of which being incorporated herein by reference in their entireties.

FIELD

Disclosed embodiments relate to a pneumatic pressure-regulating valve for a brake control system of a rail vehicle, and to a pneumatic control valve for a brake control system of a rail vehicle.

BACKGROUND

Pneumatic brake systems for direct brake control for rail vehicles are generally operated with a supply pressure of 8 to 10 bar. The supply pressure is used to generate the brake cylinder pressure C, which is normally limited to 3.8 bar for a full brake and emergency brake. A pressure-regulating valve, or pressure reduction valve, in the pilot control circuit serves here for protecting the brake mechanism against overloading if the maximum brake cylinder pressure is significantly overshot. If it is the intention to shut off the brake system on the rail vehicle, the supply pressure is pneumatically isolated and the brake system is ventilated. To eliminate all brake cylinder pressure in the event of such a deactivation of the brake system, that is to say when the supply pressure is ventilated, it is likewise necessary to ventilate the brake cylinder pressure, more specifically the fluid volume that generates the brake cylinder pressure. For this purpose, use has hitherto been made of a separate non-return valve at the outlet of the relay valve.

The pressure reduction valve that limits the supply pressure is situated in series with the regulated brake actuation means, such that a full braking operation in the case of the service brake can be delayed in terms of its action by the pressure reduction valve, and must therefore be set to an increased level. For example, the maximum full braking pressure is set to 3.8 bar in the case of the service brake and to 3.9 bar in the emergency brake circuit.

Furthermore, small leaks in the pressure reduction valve are intensified by the relay, and are often the cause of faults and complaints.

Since the pressure reduction valve only delimits one path in the pilot control circuit, other paths that likewise influence or can influence the brake pressure are not delimited.

SUMMARY

In view of the statements above, disclosed embodiments provide a pneumatic pressure-regulating valve for a brake control system of a rail vehicle, and a pneumatic control valve for a brake control system of a rail vehicle, which reliably limit the maximum brake pressure in order to protect the brake mechanism and, when the brake system is shut off, automatically ventilate the brake cylinder pressure with the ventilation of the supply pressure. This is provided by a pneumatic pressure-regulating valve for a brake control system of a rail vehicle and by a pneumatic control valve for a brake control system of a rail vehicle.

BRIEF DESCRIPTION OF THE FIGURES

Disclosed embodiments will be discussed in more detail below on the basis of an embodiment and with reference to the appended figures. In detail, in the figures.

DETAILED DESCRIPTION

Figure 1:
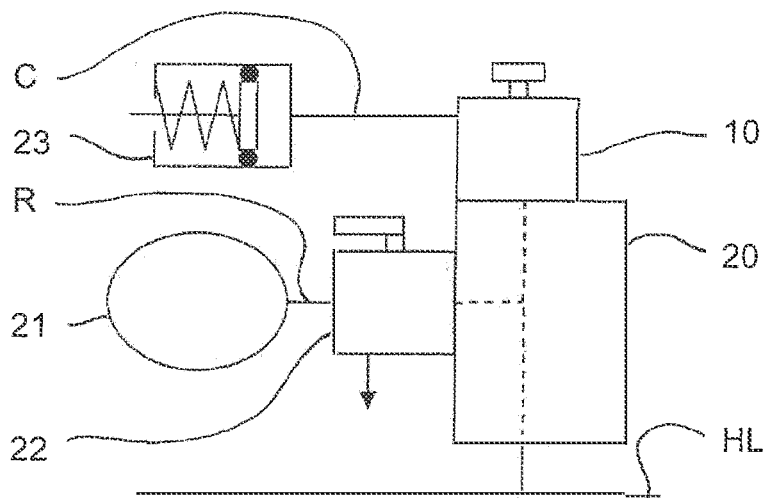
FIG. 1 is a simplified schematic illustration of a brake control system for rail vehicles, having a pneumatic control valve that comprises a pneumatic pressure-regulating valve according to disclosed embodiments.

A pneumatic pressure-regulating valve for a brake control system of a rail vehicle has a first pressure chamber, to which a brake pressure can be applied, and a second pressure chamber, to which a predetermined settable pressure can be applied, wherein the first pressure chamber and the second pressure chamber are sealed off with respect to one another by a pressure-equalizing piston, and wherein the pressure-equalizing piston is configured to open a fluidic connection from the first pressure chamber to a ventilation channel if the pressure action of the pressure on the pressure-equalizing piston in the first pressure chamber is greater than the pressure action of the pressure on the pressure-equalizing piston in the second pressure chamber.

The pressure-equalizing piston may be configured as a movable component. Here, the movement takes place between at least one first position, in which the pressure-equalizing piston closes the fluidic connection from the first pressure chamber to the ventilation channel, and at least one second position, in which the pressure-equalizing piston opens the fluidic connection from the first pressure chamber to the ventilation channel. In the at least one first position, the pressure action of the pressure on the pressure-equalizing piston in the first pressure chamber is less than or equal to the pressure action of the pressure on the pressure-equalizing piston in the second pressure chamber. The pressure action need not correspond here to the pressures respectively prevailing in the pressure chambers, but may be adapted in accordance with a surface design of the pressure-equalizing piston on which the pressure acts in a direction of movement. As an alternative to a movable component, the pressure-equalizing piston may also be replicated by other components to which pressure is applied. These components to which pressure is applied have a similar operating principle, that is to say open and close the ventilation channel in a manner dependent on the pressure ratio of the first and second pressure chambers.

Through the regulation of the brake pressure that is possible by way of the set pressure ratio, it is possible to reduce maintenance intervals that would have to be provided for example for the required regular checking of the spring setting in the case of safety valves. Furthermore, leak-tightness for the brake pressure is ensured as long as the pressure action on the pressure-equalizing piston in the second pressure chamber is greater than or equal to the pressure action on the pressure-equalizing piston in the first pressure chamber. The above embodiment requires relatively little structural space and can be implemented inexpensively.

In one embodiment, the predetermined settable pressure is predetermined such that the pressure-equalizing piston opens the fluidic connection from the first pressure-equalizing chamber to the ventilation channel if the brake pressure overshoots a predetermined maximum brake pressure.

Accordingly, the pressure-equalizing piston is moved into the at least one second position if the pressure action corresponding to the overshooting of the maximum brake pressure acts on the pressure-equalizing piston in the first pressure chamber. The brake mechanism can thus be reliably protected.

In particular, the pressure-equalizing piston is configured to open the fluidic connection from the first pressure-equalizing chamber to the ventilation channel if the predetermined settable pressure is undershot.

The pressure ratio is accordingly set such that a reduction of the pressure action on the pressure-equalizing piston in the second pressure chamber proceeding from the predetermined settable pressure moves the pressure-equalizing piston into the at least one second position. The fluid volume that causes the brake pressure can thus be automatically ventilated by way of a reduction in pressure in the second pressure chamber.

In one refinement, the pressure-equalizing piston has a first piston portion, which faces toward the first pressure chamber, and a second piston portion, which faces toward the second pressure chamber, wherein the first end surface, which faces toward the first pressure chamber and to which the brake pressure can be applied, of the first piston portion as a valve seat is smaller than the second end surface, which faces toward the second pressure chamber and to which the predetermined settable pressure can be applied, of the second piston portion.

The surface that is relevant for the pressure action in the direction of movement of the pressure-equalizing piston is consequently smaller in the second pressure chamber than in the first pressure chamber. In this way, in the case of the same pressure being applied to the respective surfaces, a greater pressure action is achieved in the second pressure chamber. Correspondingly, the predetermined settable pressure that is required in the second pressure chamber to hold the pressure-equalizing piston in the at least one first position can be selected to be lower than the maximum brake pressure that is to be tolerated.

In one embodiment, the pressure-equalizing piston is configured as a double cylinder.

Through the use of a double cylinder, it is possible to easily implement a pressure-equalizing piston with respectively different effective surfaces. The diameter of the piston portion end surfaces on both sides corresponds here to the pressure ratio which is to be provided and with which the pressure-equalizing piston is to be held in the at least one first position. The respective double cylinder portions may bear directly against one another in the direction of movement of the pressure-equalizing piston, or may be connected to one another via an intermediate element.

In one embodiment, the predetermined settable pressure in the second pressure chamber can be set by way of a supply pressure.

This has the advantage that the already-existing supply pressure can be utilized, such that no additional pressure sources are required. In particular, however, even if the supply pressure is withdrawn, the predetermined set pressure is likewise reduced, such that the fluid volume that causes the brake pressure can be automatically ventilated in a manner dependent on the supply pressure. Accordingly, the predetermined set pressure with which the pressure-equalizing piston is held in the at least one first position may correspond to a minimum supply pressure. This means that a predetermined value of the minimum supply pressure causes the predetermined settable pressure in the second pressure chamber. In particular, the pressure in the second pressure chamber varies here if the supply pressure undershoots the minimum supply pressure. The minimum supply pressure may also correspond to a maximum supply pressure.

In one refinement, the pressure-regulating valve has a third pressure chamber, to which the supply pressure can be applied, and a piston valve, wherein the piston valve is configured to open a fluidic connection between the third pressure chamber and the second pressure chamber if a pressure in the third pressure chamber owing to the supply pressure is lower than the predetermined settable pressure, and to shut off the fluidic connection between the third pressure chamber and the second pressure chamber by a valve seat if the pressure in the third pressure chamber is higher than or equal to the predetermined settable pressure.

Accordingly, the predetermined settable pressure can be set in the second pressure chamber by the piston valve. In the absence of supply pressure, the piston valve is situated in a position in which the fluidic connection between the second and third pressure chambers is open. If the supply pressure is now applied to the third pressure chamber, the fluidic connection between the second and third pressure chambers is closed by the piston valve if the predetermined settable pressure is attained in the second pressure chamber in accordance with a predetermined minimum supply pressure. Conversely, the piston valve may open the fluidic connection between the second and third pressure chambers again if the predetermined minimum supply pressure is undershot. In one embodiment, the piston valve may be configured such that, once force equilibrium has been established and the second pressure chamber has thus been sealed off, the piston valve initially remains closed irrespective of the supply pressure. Some other form of ventilation, that is to say an additional openable fluidic connection, would thus have to be provided in order to open the piston valve, as will be described below.

In particular, the pressure-regulating valve has a fourth pressure chamber which is fluidically connected to the second pressure chamber via a channel extending through the piston valve, wherein the third pressure chamber is arranged between the second pressure chamber and the fourth pressure chamber, and a flat diaphragm which is arranged in the third pressure chamber and through which the piston valve extends allows a fluidic connection between the third pressure chamber and the fourth pressure chamber.

If the pressure in the second pressure chamber and thus also the pressure in the fourth pressure chamber are higher than the pressure in the third pressure chamber, the sealing between the fourth pressure chamber and the third pressure chamber by the flat diaphragm is eliminated. As a result, air flows from the fourth pressure chamber into the third pressure chamber. Owing to the channel, the pressure in the second pressure chamber thus also decreases, such that the piston valve opens the fluidic connection between the second pressure chamber and the fourth pressure chamber, such that the second pressure chamber is ventilated. As a result, the pressure in the second pressure chamber simultaneously falls below the predetermined set pressure, such that the pressure-equalizing piston is moved into the at least one second position. The first pressure chamber is thus ventilated.

The ventilation by way of the opening of the flat diaphragm can thus constitute an additional ventilation possibility addressed above, such that the piston valve is initially held in the closed position irrespective of the supply pressure after the second pressure chamber has been sealed off by the valve seat, and ventilation of the second pressure chamber takes place only by way of the conditions for the opening of the flat diaphragm. In such a situation, the piston of the piston valve is arranged in the second pressure chamber. The piston may however also be arranged in the third pressure chamber, such that the force equilibrium for sealing off the second pressure chamber is determined directly by way of the pressure ratio in the second and third pressure chambers.

In one embodiment, the piston valve is subjected to pressure loading in an axial direction by a spring element.

By the spring element, the piston valve is thus preloaded counter to the closing direction of the piston valve. In this way, the predetermined settable pressure in the second pressure chamber can be set in a manner dependent on the spring force. The higher the spring force, the higher the predetermined settable pressure that prevails in the second pressure chamber upon the closure of the fluidic connection between the second pressure chamber and the fourth pressure chamber.

In one embodiment, the predetermined settable pressure is substantially 20% of the supply pressure.

With corresponding design, the pressure-equalizing piston can thus be held in the at least one first position even with a relatively low predetermined settable pressure.

In a further aspect, disclosed embodiments relate to a pneumatic control valve for a brake control system of a rail vehicle, which pneumatic control valve has a pneumatic pressure-regulating valve as described above.

In this way, a brake pressure can be implemented independently of a supply pressure. An integrated non-return function of the pneumatic control valve is possible by the pneumatic pressure-regulating valve.

FIG. 1 is a simplified schematic illustration of a brake control system for rail vehicles. A control valve 20 is arranged at a main air line HL which extends through the entire train. In turn, an air reservoir 21 is arranged at the control valve 20, which air reservoir generates a supply pressure R which issues into the control valve 20, and which air reservoir can be ventilated by a plug valve 22. The control valve 20 controls the filling of the air reservoir 21. A pneumatic pressure-regulating valve 10 is integrated in the control valve 20. The brake pressure C issues into a brake cylinder 23 that converts the pressure into a force for a friction brake (not illustrated here). The pneumatic pressure-regulating valve 10 serves for pressure limitation for the brake cylinder 23, which is at the brake pressure C. If the plug valve 22 is opened and the air reservoir 21 is thus ventilated, the brake pressure line C is likewise also ventilated by the non-return valve function in the pneumatic pressure-regulating valve 10.

Figure 2:
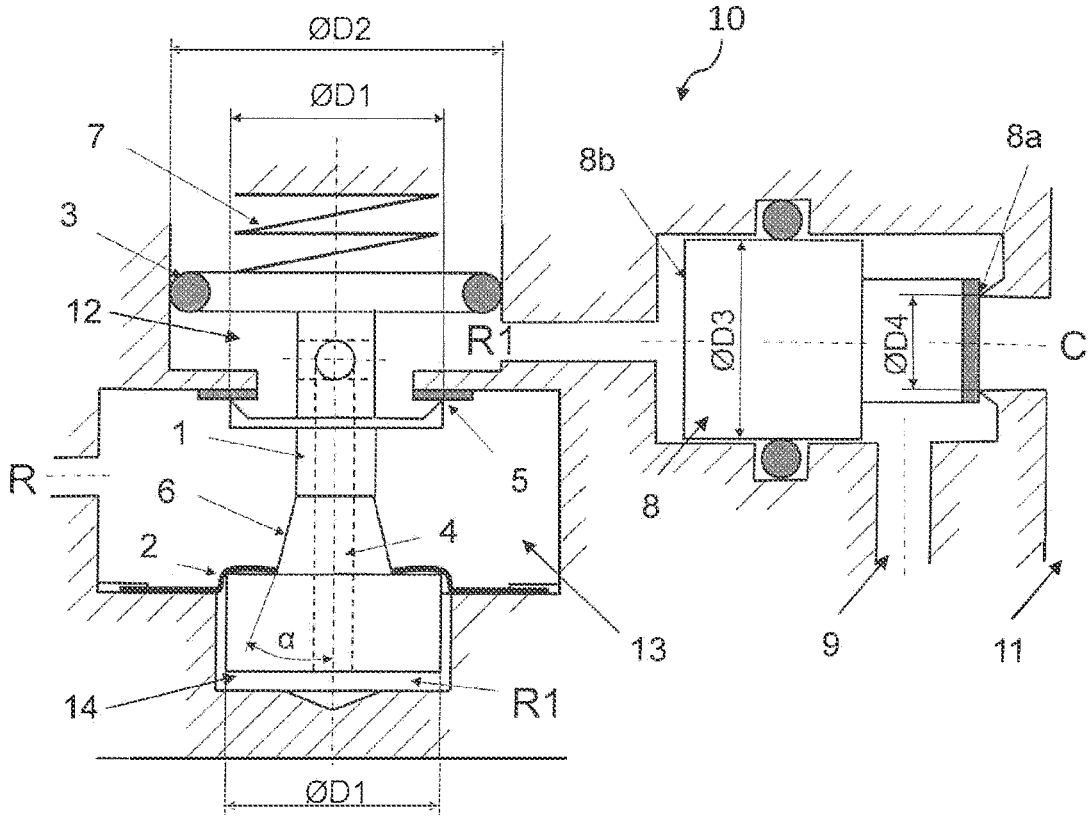
FIG. 2 shows a schematic cross-sectional view of a pressure-regulating valve, such as can be used in FIG. 1, in an exemplary embodiment.

As per FIG. 2, the pneumatic pressure-regulating valve has four pressure chambers 11, 12, 13 and 14, to which compressed air can be applied. A brake pressure C can be applied to the first pressure chamber 11. The first pressure chamber 11 need not be completely enclosed by the housing of the pressure-regulating valve 10, but may, as in the embodiment illustrated, be formed merely by a spatial volume of a housing inlet of the pressure-regulating valve 10. The remaining part of the sealed-off fluid chamber for the build-up of pressure may thus also be formed by other components. The first pressure chamber 11 is sealed off from the second pressure chamber 12 by a pressure-equalizing piston 8 in interaction with a sealing element. The pressure-equalizing piston 8 is movable in an axial direction in a manner dependent on the pressure ratio between the brake pressure C in the first pressure chamber 11 and a predetermined settable pressure R1 in the second pressure chamber 12. For this purpose, the pressure-equalizing piston 8 is configured as a double cylinder, which has a first piston portion 8a and a second piston portion 8b, which adjoins the first piston portion in an axial direction. That end surface of the first piston portion 8a which is averted from the second piston portion 8b closes a fluidic connection between the first pressure chamber 11 and a ventilation channel 9 if the pressure action of the pressure in the second pressure chamber 12 is greater than or equal to the pressure action of the pressure in the first pressure chamber 11. The pressure action arises from the pressure prevailing in the respective pressure chambers 11 and 12 in conjunction with the respective end surfaces. The end surface of the first piston portion 8a has a diameter D4 smaller than the diameter D3 of the end surface of the second piston portion 8b. Thus, the pressure-equalizing piston 8 closes the fluidic connection between the first pressure chamber 11 and the ventilation channel 9 for as long as $R1 \geq C*(D4^2/D3^2)$. The pressure-equalizing piston 8 is automatically moved from the first position into a second position, in which the fluidic connection between the first pressure chamber 11 and the ventilation channel 9 is open, if $R1 < C*(D4^2/D3^2)$. The first pressure chamber is accordingly ventilated if the brake pressure C overshoots a predetermined maximum brake pressure or, for example, the pressure in the second pressure chamber is reduced by ventilation.

In the embodiment illustrated, the pressure R1 is set by way of a supply pressure R via the third pressure chamber 13 in interaction with a piston valve 1. For this purpose, the second pressure chamber 12 can be sealed off by a piston 3 and a valve seat 5 arranged on a valve plunger 6. The piston 3 is movable bidirectionally in an axial direction of the valve plunger 6 in the pressure-regulating valve 10 and is sealed off with respect to the housing in a radial direction by a sealing element. On that side of the piston 3 which is averted from the valve plunger 6, there is arranged a preloaded spring element 7, the spring force of which exerts load in an axial direction on the piston 3 and thus on the valve plunger 6.

For a release of pressure, the second pressure chamber 12 is connected via a channel 4, which extends in an axial direction through the valve plunger 6, to the fourth pressure chamber 14. The third pressure chamber 13 is arranged between the second pressure chamber 12 and the fourth pressure chamber 14. The third pressure chamber can be sealed off at one side with respect to the second pressure chamber 12 by the valve seat 5 and at the other side with respect to the fourth pressure chamber 14 by a flat diaphragm 2.

Proceeding from a state in which the third pressure chamber 13 has been ventilated, the piston valve 1 is opened, such that the second pressure chamber 12 and the third pressure chamber 13 are fluidically connected. When the supply pressure R is introduced, compressed air flows from the third pressure chamber 13 into the second pressure chamber 12 until, when the predetermined settable pressure R1 is reached, the valve seat 5 seals off the second pressure chamber 12 from the third pressure chamber 13. The piston valve 1 is then held in the closed position by way of the predetermined settable pressure R1 owing to the force equilibrium between the spring element 7 and the predetermined settable pressure R1.

After the predetermined set pressure R1 has been set, the second pressure chamber 12 can then be ventilated by virtue of the flat diaphragm 2 being opened and the force equilibrium between spring element 7 and piston 3 thus being eliminated. If the pressure prevailing in the fourth pressure chamber 14 via the channel 4 is higher than the pressure in the third pressure chamber 13, the flat diaphragm 2 opens. As a result, compressed air flows from the fourth pressure chamber 14 and thus also from the second pressure chamber 12 into the third pressure chamber 13. Owing to the pressure drop in the second pressure chamber 12, the force equilibrium on the piston 3 is eliminated, and the piston is moved in the opening direction of the piston valve 1 owing to the spring force. The valve seat 5 is consequently no longer closed, such that the fluidic connection between the second pressure chamber 12 and the third pressure chamber 13 is also opened.

With the ventilation of the second pressure chamber 12, the elimination of the force equilibrium on the pressure-equalizing piston 8 then causes the first pressure chamber 11 to also be ventilated.

Disclosed embodiments are not restricted to the embodiments described. Even though, for example, the pressure-equalizing valve in the described exemplary embodiment comprises a fourth pressure chamber 14, via which the second pressure chamber 12 can be ventilated, the fourth pressure chamber may be omitted. For example, the piston 3 of the piston valve may simultaneously function as a valve seat and be arranged in the third pressure chamber, such that ventilation can take place directly by way of the elimination of the force equilibrium by the pressures respectively acting on the piston 3 in the second pressure chamber 12 and third pressure chamber 13, or the variation of the pressures. The pressure-regulating valve may likewise be used for a brake control system for rail vehicles with directly acting brake control. Here, a directly generated brake pilot control pressure Cv is converted directly into the brake cylinder pressure C by a relay valve, to which a supply pressure R is likewise supplied. Here, the brake cylinder pressure C may exhibit 1:1 correspondence with respect to the brake cylinder pilot control pressure Cv, though may also, depending on vehicle loading, vehicle speed or the like, have some other relationship with respect to the brake cylinder pilot control pressure Cv, depending on the relay valve type. The design corresponds to the illustration shown in FIG. 1, wherein the main air line HL shown in FIG. 1 corresponds to the feed line of the brake cylinder pilot control pressure Cv, and the control valve 20 indicated in FIG. 1 corresponds to the relay valve.

LIST OF REFERENCE SIGNS

1 Piston valve
2 Flat diaphragm
3 Piston
4 Channel
5 Valve seat
6 Valve plunger
7 Spring element
8 Pressure-equalizing piston
8a First piston portion
8b Second piston portion
9 Ventilation channel
10 Pressure-regulating valve
11 First pressure chamber 12 Second pressure chamber
13 Third pressure chamber
14 Fourth pressure chamber
20 Control valve
21 Air reservoir
22 Plug valve
23 Brake cylinder
C Brake pressure
Cv Brake pilot control pressure
D3 Second end surface
D4 First end surface
HL Main air line
R Supply pressure
R1 Settable pressure

The invention claimed is:

1. A pneumatic pressure-regulating valve for a brake control system of a rail vehicle, the pneumatic pressure-regulating valve comprising:

a first pressure chamber, to which a brake pressure can be applied, and a second pressure chamber, to which a predetermined settable pressure can be applied, wherein the first pressure chamber and the second pressure chamber are sealed off with respect to one another by a pressure-equalizing piston, and wherein the pressure-equalizing piston is configured to open a fluidic connection from the first pressure chamber to a ventilation channel in response to the pressure action of the pressure on the pressure-equalizing piston in the first pressure chamber being greater than the pressure action of the pressure on the pressure-equalizing piston in the second pressure chamber, wherein the pressure-equalizing piston has a first piston portion, which faces toward the first pressure chamber, and a second piston portion, which faces toward the second pressure chamber, wherein a first end surface, which faces toward the first pressure chamber and to which the brake pressure is applied, of the first piston portion as a valve seat is smaller than a second end surface, which faces toward the second pressure chamber and to which the predetermined settable pressure is applied, of the second piston portion.

2. The pressure-regulating valve of claim 1, wherein the predetermined settable pressure is predetermined such that the pressure-equalizing piston opens the fluidic connection from the first pressure-equalizing chamber to the ventilation channel in response to the brake pressure overshooting a predetermined maximum brake pressure.

3. The pressure-regulating valve of claim 1, wherein the pressure-equalizing piston is configured to open the fluidic connection from the first pressure-equalizing chamber to the ventilation channel in response to the predetermined settable pressure being undershot.

4. The pressure-regulating valve of claim 1, wherein the pressure-equalizing piston is configured as a double cylinder.

5. The pressure-regulating valve claim 1, wherein the predetermined settable pressure in the second pressure chamber is set by a supply pressure.

6. The pressure-regulating valve of claim 5, wherein the pressure-regulating valve has a third pressure chamber, to which the supply pressure is applied, and a piston valve, wherein the piston valve is configured to open a fluidic connection between the third pressure chamber and the second pressure chamber in response to a pressure in the third pressure chamber owing to the supply pressure being lower than the predetermined settable pressure, and configured to shut off the fluidic connection between the third pressure chamber and the second pressure chamber by a second valve seat in response to the pressure in the third pressure chamber being higher than or equal to the predetermined settable pressure.

7. The pressure-regulating valve of claim 6, wherein the pressure-regulating valve has a fourth pressure chamber which is fluidically connected to the second pressure chamber via a channel extending through the piston valve, wherein the third pressure chamber is arranged between the second pressure chamber and the fourth pressure chamber, and a flat diaphragm which is arranged in the third pressure chamber and through which the piston valve extends allows a fluidic connection between the third pressure chamber and the fourth pressure chamber.

8. The pressure-regulating valve of claim 6, wherein the piston valve is subjected to pressure loading in an axial direction by a spring element.

9. The pressure-regulating valve of claim 5, wherein the predetermined settable pressure is substantially 20% of the supply pressure.

10. A pneumatic control valve or relay valve for a brake control system of a rail vehicle comprising a pneumatic pressure-regulating valve as claimed in claim 1.

* * * * *